(12) United States Patent
Epp et al.

(10) Patent No.: US 12,044,949 B2
(45) Date of Patent: Jul. 23, 2024

(54) MITIGATING CROSS-COUPLING IN OPTICAL COMMUNICATIONS SYSTEM

(71) Applicant: X DEVELOPMENT LLC, Mountain View, CA (US)

(72) Inventors: Paul Epp, Sunnyvale, CA (US); Andrei Kazmierski, Pleasanton, CA (US); Devin Brinkley, Redwood City, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 18/489,116

(22) Filed: Oct. 18, 2023

(65) Prior Publication Data

US 2024/0192572 A1 Jun. 13, 2024

Related U.S. Application Data

(60) Provisional application No. 63/431,795, filed on Dec. 12, 2022.

(51) Int. Cl.
*G02F 1/29* (2006.01)
*G02B 27/00* (2006.01)

(52) U.S. Cl.
CPC ......... *G02F 1/292* (2013.01); *G02B 27/0087* (2013.01); *G02F 2203/50* (2013.01)

(58) Field of Classification Search
CPC .. G02F 1/292; G02F 2203/50; G02B 27/0087
See application file for complete search history.

(56) References Cited

U.S. PATENT DOCUMENTS

| 3,764,213 A | 10/1973 | O'Meara |
|---|---|---|
| 7,274,442 B2 | 9/2007 | Dolne et al. |
| 9,778,448 B2 | 10/2017 | Chann |
| 10,135,527 B1 | 11/2018 | Csonka et al. |
| 10,461,967 B1 | 10/2019 | Ahmed et al. |

(Continued)

FOREIGN PATENT DOCUMENTS

WO 2012167135 A1 12/2012

OTHER PUBLICATIONS

International Search Report and Written Opinion for International Application No. PCT/US2023/082267 dated Mar. 25, 2024 (13 pages).

(Continued)

*Primary Examiner* — Joseph P Martinez
(74) *Attorney, Agent, or Firm* — Botos Churchill IP Law (57) ABSTRACT

Aspects of the disclosure provide a system including a first communications terminal. The first communications terminal may include an optical phased array (OPA) including a plurality of phase shifters configured to receive an optical communications beam from a second communications terminal. The first communications terminal may also include one or more processors configured to determine a link axis for communication with the second communications terminal based on the received optical communications beam, identify a compensatory wavefront curvature for mitigating cross-coupling, and generate a wavefront of an outgoing optical communications beam using the plurality of phase shifters based on the determined link axis and the compensatory wavefront curvature.

20 Claims, 8 Drawing Sheets

(56) References Cited

U.S. PATENT DOCUMENTS

| | | | |
|---|---|---|---|
| 10,871,639 | B2 | 12/2020 | Chann |
| 11,005,565 | B1 | 5/2021 | Mitchell et al. |
| 11,290,183 | B2 | 3/2022 | Dickson |
| 2004/0156638 | A1 | 8/2004 | Graves et al. |
| 2012/0308239 | A1 | 12/2012 | Sheth et al. |
| 2013/0208361 | A1 | 8/2013 | Chann et al. |
| 2016/0043800 | A1 | 2/2016 | Kingsbury et al. |
| 2019/0049743 | A1 | 2/2019 | Akiyama et al. |
| 2019/0101392 | A1 | 4/2019 | Bischel et al. |
| 2022/0385372 | A1* | 12/2022 | Erkmen ............... H04B 10/548 |
| 2023/0318705 | A1 | 10/2023 | Csonka et al. |

OTHER PUBLICATIONS

International Search Report and Written Opinion for International Application No. PCT/US2022/052522 dated Apr. 14, 2023 (12 pages).

Carrizo, Carlos E., "Advanced Adaptive Compensation System for Free-Space Optical Communications", Universitat Politècnica De Catalunya, Department of Signal Theory and Communications, 2019, pp. 1-177.

Chen, Mo , et al., "Highly sensitive fiber coupling for free-space optical communications based on an adaptive coherent fiber coupler", Aug. 2018; Optics Communications; pp. 1-4 (Year: 2018).

Cowan, William D, "Foundry Microfabrication of Deformable Mirrors For Adaptive Optics", AFIT/DS/ENG/98-07, Graduate School of Engineering of the Air Force Institute of Technology, Air Education and Training Command, 1998, pp. 1-276.

Hodges, Richard E., et al., "A Deployable High-Gain Antenna Bound for Mars", IEEE Antennas & Propagation Magazine, 2017, pp. 39-49.

Kingsbury, Ryan , et al., "Design of a Free-Space Optical Communication Module for Small Satellites", 28th Annual AIAA/USU, Conference on Small Satellites, 2014, pp. 1-10.

Mekhiel, Christopher , et al., "Monolithic Silicon-on-Insulator Optical Beam Steering with Phase Locking Heterodyne Feedback", Department of Electrical and Computer Engineering Ryerson University, Toronto, Canada, Downloaded on Oct. 18, 2022 at 23:46:08 UTC from IEEE Xplore, pp. 1-5.

Moosavi, Seyed Ayoob, et al., "Improvement of coupling efficiency in free space optical communication with a multi actuator adaptive lens", ResearchGate, Optics Letters, 2019, pp. 1-6.

Podoliak, Nina , et al., "Subwavelength line imaging using plasmonic waveguides", Optoelectronics Research Centre, University of Southampton, Nanobiophysics (NBP), MESA+ Institute for Nanotechnology, Complex Photonic Systems (COPS), MESA+ Institute for Nanotechnology, 2014, pp. 1-7.

Thompson, A.R. , "An Introduction to the VLA Electronic System", VLA Technical Report No. 29, 1977, pp. 1-100.

Tymchenko, M. , et al., "Advanced control of nonlinear beams with Pancharatnam-Berry metasurfaces", American Physical Society, Physical Review B 94, pp. 214303 (2016), 214303-1-13.

Yu, Lin , et al., "Free-Space to Fiber Coupling of Electromagnetic Gaussian Schell-Model Beams in Turbulent Marine Atmospheric Channel", IEEE Photonics Journal, vol. 10, No. 6, 2018, pp. 1-10.

* cited by examiner

MITIGATING CROSS-COUPLING IN OPTICAL COMMUNICATIONS SYSTEM

CROSS REFERENCE TO RELATED APPLICATIONS

This application claims the benefit of the filing date of U.S. Provisional Patent Application No. 63/431,795 filed Dec. 12, 2022, the disclosure of which is hereby incorporated herein by reference.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to an aperture of a communications terminal at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits of adaptive-optics, point-to-multipoint support, and mesh network topologies. Each active element in the OPA requires electro-optic phase shifting capability.

BRIEF SUMMARY

Aspects of the disclosure provide a system including a first communications terminal. The first communications terminal includes an optical phased array (OPA) including a plurality of phase shifters configured to receive an optical communications beam from a second communications terminal, and one or more processors. The one or more processors are configured to determine a link axis for communication with the second communications terminal based on the received optical communications beam; identify a compensatory wavefront curvature for mitigating cross-coupling; and generate a wavefront of an outgoing optical communications beam using the plurality of phase shifters based on the determined link axis and the compensatory wavefront curvature.

In one example, the system also includes the second communications terminal. In another example, the one or more processors are further configured to identify the compensatory wavefront curvature by determining the compensatory wavefront curvature based on a distance between the first communications terminal and the second communications terminal, a wavelength of the wavefront, and an aperture sizes of the first communications terminal or the second communications terminal. In this example, the one or more processors are further configured to determine an updated distance between the first communications terminal and the second communications terminal and adjust the compensatory wavefront curvature based on the updated distance. In addition, the updated distance is determined based on timing information received by the first communications terminal from the second communications terminal. In another example, the generated wavefront has a beam waist midway between the first communications terminal and the second communications terminal. In another example, a radius of curvature of the generated wavefront when received at the receiving communications terminal is equal to a distance between the first communications terminal and the second communications terminal.

Another aspect of the disclosure provides a method comprising for generating an outgoing communications beam at a first communications terminal. The method includes determining a link axis for communication with a second communications terminal based on a received optical communications beam; identifying a compensatory wavefront curvature for mitigating cross-coupling; and generating a wavefront of an outgoing optical communications beam using a plurality of phase shifters of an optical phased array (OPA) architecture based on the determined link axis and the compensatory wavefront curvature.

In one example, the method also includes transmitting the outgoing optical communications beam to the second communications terminal. In another example, the method also includes identifying the compensatory wavefront curvature includes determining the compensatory wavefront curvature based on a distance between the first communications terminal and the second communications terminal, a wavelength of the wavefront, and respective aperture sizes of the first communications terminal and the second communications terminal. In this example, the method also includes determining an updated distance between the first communications terminal and the second communications terminal and adjusting the compensatory wavefront curvature based on the updated distance. In addition, the updated distance is determined based on timing information received by the transmitting communications terminal from the receiving communications terminal. In another example, the generated wavefront has a beam waist midway between the first communications terminal and the second communications terminal. In another example, a radius of curvature of the generated wavefront when received at the second communications terminal is equal to a distance between the first communications terminal and the second communications terminal.

A further aspect of the disclosure provides a non-transitory machine-readable medium on which instructions are stored. The instructions, when executed by one or more processors, cause the one or more processors to perform a method of generating an outgoing communications beam at a first communications terminal. The method includes determining a link axis for communication with a second communications terminal based on a received optical communications beam; identifying a compensatory wavefront curvature for mitigating cross-coupling; and generating a wavefront of an outgoing optical communications beam using a plurality of phase shifters of an optical phased array (OPA) architecture based on the determined link axis and the compensatory wavefront curvature.

In one example, the method also includes transmitting the outgoing optical communications beam to the second communications terminal. In another example, identifying the compensatory wavefront curvature includes determining the compensatory wavefront curvature based on a distance between the first communications terminal and the second communications terminal, a wavelength of the wavefront, and an aperture sizes of the first communications terminal or the second communications terminal. In this example, the method also includes determining an updated distance between the first communications terminal and the second communications terminal and adjusting the compensatory wavefront curvature based on the updated distance. In another example, the generated wavefront has a beam waist midway between the first communications terminal and the second communications terminal. In another example, a radius of curvature of the generated wavefront when received at the second communications terminal is equal to a distance between the first communications terminal and the second communications terminal.

DETAILED DESCRIPTION

Overview

The technology relates to using optical phased array (OPA) architecture to adjust tilt and/or radius of curvature of a wavefront in order to mitigate cross-coupling between communications terminals in optical communications systems. The communications terminals may rely on a closed-loop control for the link axis. For example, each communications terminal may use its OPA architecture to detect the tilt of a received signal from one communications terminal in order to determine a link axis for directing a signal back to that transmission terminal. A "cross-coupling" effect may result from the natural evolution of a wavefront as it propagates from the transmitting communications terminal to the receiving communications terminal due to an improper pointing of the communications terminals along a link axis. Depending on the wavelength, distance between the communications terminals, and size of the aperture (of the transmitting communications terminal), when a transmitting communications terminal transmits a signal including a flat or planar wavefront, various factors may cause an improper sensing of tilt at the receive terminal. For example, in the gaussian approximation, as the initially flat-wavefront beam propagates from the launch aperture, the radius of curvature slowly gets smaller (still much larger than the distance back to the launch aperture) until it reaches a minimum at a distance of one "Rayleigh range" from the launch aperture. After sufficient propagation, eventually the wavefront radius of curvature may be about equal to the distance back to the launch aperture.

Mismatch between the wavefront radius of curvature and the distance back to the launch aperture can give rise to a local tilt which places the apparent position of the transmitting communications terminal at a distance behind its true location. As a result, the receiving communications terminal may receive a section of a spherical wavefront with a center-of-curvature located at a point behind the transmitting communications terminal. The receiving communications terminal will then transmit back to this point, and not to the actual location of the transmitting communications terminal.

To address this improper pointing, the radius-of-curvature of the wavefront sent by the transmitting communications terminal may be adjusted by imposing a specific compensatory wavefront curvature at the transmitting communications terminal. If done correctly, the receiving communications terminal may detect a spherical wavefront with center of curvature located exactly at the transmitting communications terminal (instead of behind it). Thus, the receiving communications terminal may be able to point back at the transmitting communications terminal correctly, eliminating the improper pointing, and therefore eliminating the cross-coupling effect.

The compensatory wavefront curvature may be determined by the distance between the two communications terminals, the frequency of the wavefront to be generated, and the respective aperture sizes of the transmitting and receiving communications terminals. Such a compensatory wavefront at the transmitting communications terminal may be generated by an OPA architecture within the transmitting communications terminal. Instead of simply launching a wavefront propagating along the determined link axis, sets of phase shifters of the OPA architecture may launch a section of a spherical wavefront of curvature determined by the aforementioned parameters.

The features described herein may provide for adjustments to tilt and curvature in a wavefront of a transmitted communications beam in order to mitigate cross-coupling between communications terminals in optical communications systems. This may result in more accurate pointing and therefore better overall performance of the communication system.

Example Systems

Figure 1:
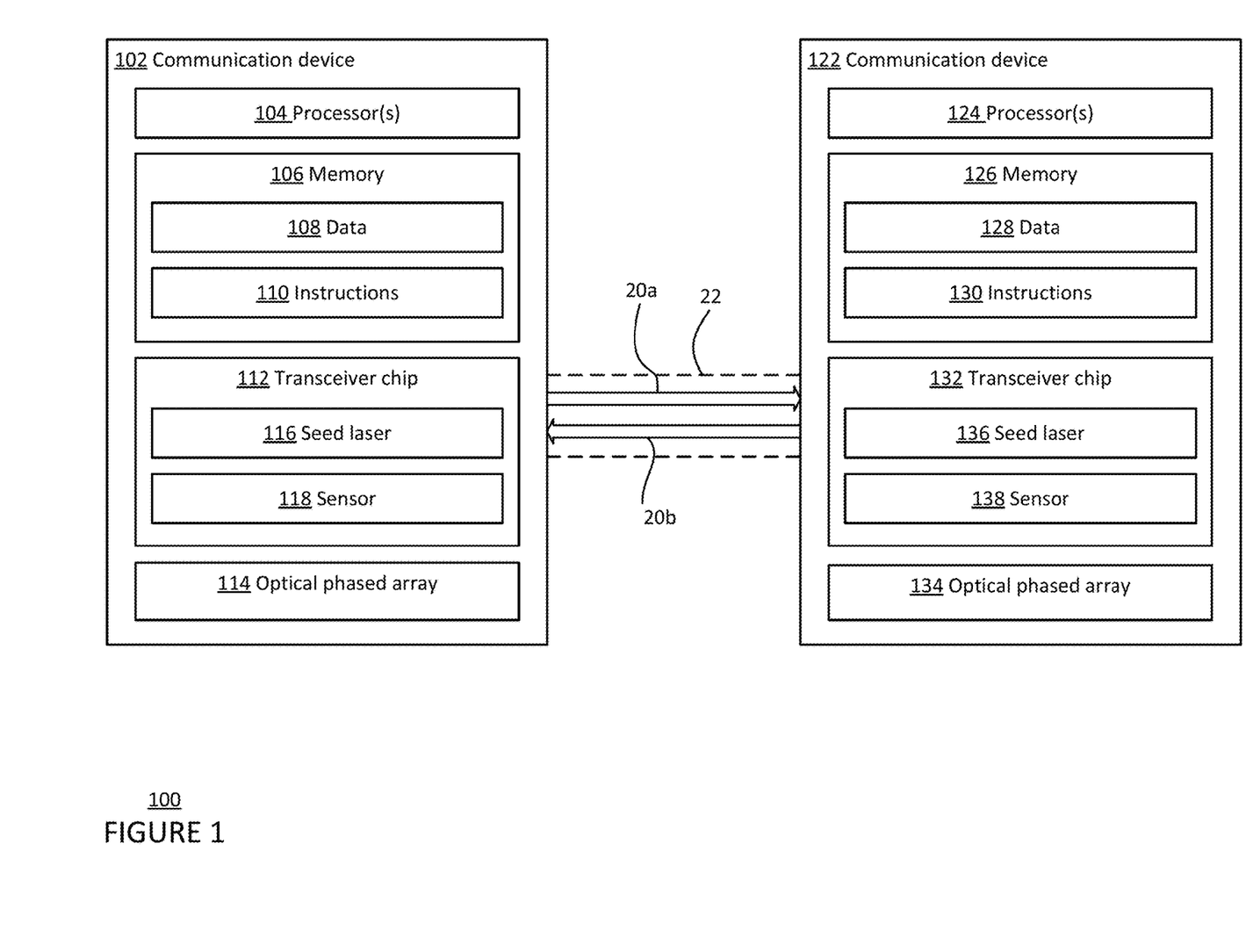
FIG. 1 is a block diagram 100 of a first communications terminal and a second communications terminal in accordance with aspects of the disclosure.
Figure 2:
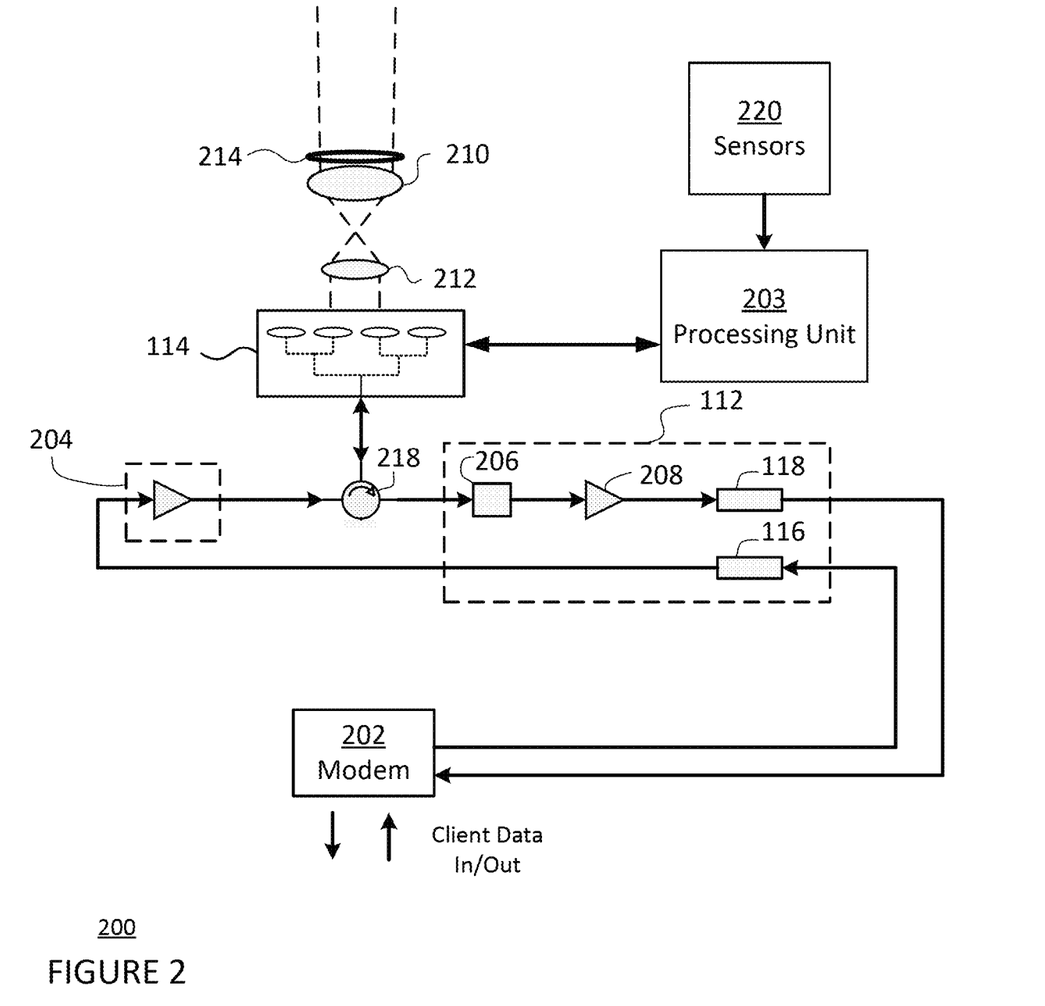
FIG. 2 is a pictorial diagram 200 of an example system architecture for the first communications terminal of FIG. 1 in accordance with aspects of the disclosure.

FIG. 1 is a block diagram 100 of a first communications terminal configured to form one or more links with a second communications terminal, for instance as part of a system such as a free-space optical communication (FSOC) system. FIG. 2 is a pictorial diagram 200 of an example communications terminal, such as the first communications terminal of FIG. 1. For example, a first communications terminal 102 includes one or more processors 104, a memory 106, a transceiver photonic integrated chip 112, and an optical phased array (OPA) architecture 114. In some implementations, the first communications terminal 102 may include more than one transceiver chip and/or more than one OPA architecture (e.g., more than one OPA chip).

The one or more processors 104 may be any conventional processors, such as commercially available CPUs. Alternatively, the one or more processors may be a dedicated device such as an application specific integrated circuit (ASIC) or another hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communications terminal, such as memory 106, calibration information, such as one or more offsets determined for tracking a signal, may be stored.

Data 108 may be retrieved, stored or modified by one or more processors 104 in accordance with the instructions 110. For instance, although the system and method are not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps including of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), light-emitting diode (LED), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA architecture 114.

The receiver components may include at minimum a sensor 118, such as a photodiode. The sensor may convert a received signal (e.g., light or optical communications beam), into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the OPA architecture 114. The OPA architecture may include a micro-lens array, an emitter associated with each micro-lens in the array, a plurality of phase shifters, and waveguides that connect the components in the OPA. The OPA architecture may be positioned on a single chip, an OPA chip. The waveguides progressively merge between a plurality of emitters and an edge coupler that connect to other transmitter and/or receiver components. In this regard, the waveguides may direct light between photodetectors or fiber outside of the OPA architecture, the phase shifters, the waveguide combiners, the emitters and any additional component within the OPA. In particular, the waveguide configuration may combine two waveguides at each stage, which means the number of waveguides is reduced by a factor of two at every successive stage closer to the edge coupler. The point of combination may be a node, and a combiner may be at each node. The combiner may be a 2×2 multimode interference (MMI) or directional coupler.

The OPA architecture 114 may receive light from the transmitter components and outputs the light as a coherent communications beam to be received by a remote communications terminal, such as second communications terminal 122. The OPA architecture 114 may also receive light from free space, such as a communications beam from second communications terminal 122, and provides such received light to the receiver components. The OPA architecture may provide the necessary photonic processing to combine an incoming optical communications beam into a single-mode waveguide that directs the beam towards the transceiver chip 112. In some implementations, the OPA architecture may also generate and provide an angle of arrival estimate to the one or more processors 104, such as those in processing unit 203.

The first communications terminal 102 may include additional components to support functions of the communications terminal. For example, the first communications terminal may include one or more lenses and/or mirrors that form a telescope. The telescope may receive collimated light and output collimated light. The telescope may include an objective portion, an eyepiece portion, and a relay portion. As shown in FIG. 2, the first communications terminal may include a telescope including a first lens 210 (e.g., an objective lens), a second lens 212 (e.g., an eyepiece lens), and an aperture 214 (or opening) through which light may enter and exit the communications terminal. For ease of representation and understanding, the aperture 214 is depicted as distinct from the first lens 210, though the first lens may be positioned within the aperture. The first communications terminal may include a circulator, such as a single mode circulator 218, that routes incoming light and outgoing light while keeping them on at least partially separate paths. The first communications terminal may include one or more sensors 220 for detecting measurements of environmental features and/or system components.

The first communications terminal 102 may include one or more steering mechanisms, such as one or more bias means for controlling one or more phase shifters, which may be part of the OPA architecture 114, and/or an actuated/steering mirror (not shown), such as a fast/fine pointing mirror. In some examples, the actuated mirror may be a MEMS 2-axis mirror, 2-axis voice coil mirror, or a piezo-electric 2-axis mirror. The one or more processors 104, such as those in the processing unit 203, may be configured to receive and process signals from the one or more sensors 220, the transceiver chip 112, and/or the OPA architecture 114 and to control the one or more steering mechanisms to adjust a pointing direction and/or wavefront shape. The first communications terminal also includes optical fibers, or waveguides, connecting optical components, creating a path between the seed laser 116 and OPA architecture 114 and a path between the OPA architecture 114 and the sensor 118.

Returning to FIG. 1, the second communications terminal 122 may output the Tx signals as an optical communications beam 20b (e.g., light) pointed towards the first communications terminal 102, which receives the optical communications beam 20b (e.g., light) as corresponding Rx signals. In this regard, the second communications terminal 122 include one or more processors, 124, a memory 126, a transceiver chip 132, and an OPA architecture 134. The one or more processors 124 may be similar to the one or more processors 104 described above.

Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA architecture 134 of the second communications terminal 122 may be similar to the transceiver chip 112 and the OPA architecture 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA architecture 134 may include an OPA chip including a micro-lens array, a plurality of emitters, a plurality of phase shifters. Additional components for supporting functions of the communications terminal 122 may be included similar to the additional components described above. The communications terminal 122 may have a system architecture that is same or similar to the system architecture shown in FIG. 2.

Figure 3:
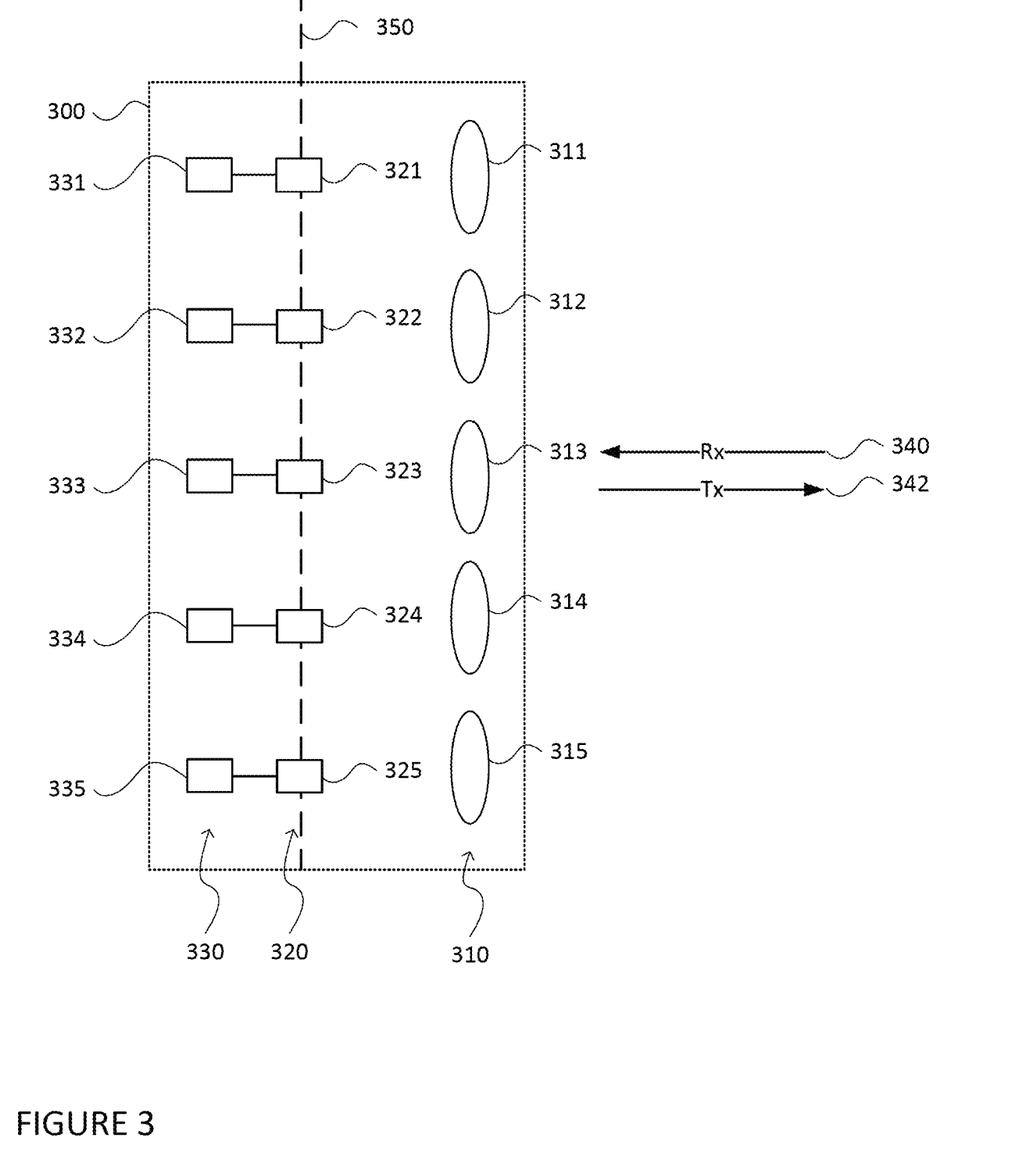
FIG. 3 represents features of an OPA architecture represented as an example OPA chip in accordance with aspects of the disclosure.

FIG. 3 represent features of OPA architecture 114 represented as an example OPA chip 300 including representations of a micro-lens array 310, a plurality of emitters 320, and a plurality of phase shifters 330. For clarity and case of understanding, additional waveguides and other features are not depicted. Arrows 340, 342 represent the general direction of Tx signals (transmitted optical communications beam) and Rx signals (received optical communications beam) as such signals pass or travel through the OPA chip 300.

The micro-lens array 310 may include a plurality of convex lenses 311-315 that focus the Rx signals onto respective ones of the plurality emitters positioned at the focal points of the micro-lens array. In this regard, the dashed-line 350 represents the focal plane of the micro-lenses 311-315 of the micro-lens array 310. The micro-lens array 310 may be arranged in a grid pattern with a consistent pitch, or distance, between adjacent lenses. In other examples, the micro-lens array 310 may be in different arrangements having different numbers of rows and columns, different shapes, and/or different pitch (consistent or inconsistent) for different lenses.

Each micro-lens of the micro-lens array may be 10's to 100's of micrometers in diameter and height. In addition, each micro-lens of the micro-lens array may be manufactured by molding, printing, or etching a lens directly into a wafer of the OPA chip 300. Alternatively, the micro-lens array 310 may be molded as a separately fabricated micro-lens array. In this example, the micro-lens array 310 may be a rectangular or square plate of glass or silica a few mm (e.g. 10 mm or more or less) in length and width and 0.2 mm or more or less thick. Integrating the micro-lens array within the OPA chip 300 may allow for the reduction of the grating emitter size and an increase in the space between emitters. In this way, two-dimensional waveguide routing in the OPA architecture may better fit in a single layer optical phased array. In other instances, rather than a physical micro-lens array, the function of the micro-lens array may be replicated using an array of diffractive optical elements (DOE).

Each micro-lens of the micro-lens array may be associated with a respective emitter of the plurality of emitters 320. For example, each micro-lens may have an emitter from which Tx signals are received and to which the Rx signals are focused. As an example, micro-lens 311 is associated with emitter 321. Similarly, each micro-lens 312-315 also has a respective emitter 322-325. In this regard, for a given pitch (i.e., edge length of a micro-lens edge length) the micro-lens focal length may be optimized for best transmit and receive coupling to the underlying emitters. This arrangement may thus increase the effective fill factor of the Rx signals at the respective emitter, while also expanding the Tx signals received at the micro-lenses from the respective emitter before the Tx signals leave the OPA chip 300.

The plurality of emitters 320 may be configured to convert emissions from waveguides to free space and vice versa. The emitters may also generate a specific phase and intensity profile to further increase the effective fill factor of the Rx signals and improve the wavefront of the Tx signals. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the gaussian intensity profile of traditional grating emitters. However, in some implementations, the emitters may be Gaussian field profile grating emitters.

The phase shifters 330 may allow for sensing and measuring Rx signals and the altering of Tx signals to improve signal strength optimally combining an input wavefront into a single waveguide or fiber. Each emitter may be associated with a phase shifter. As shown in FIG. 3, each emitter may be connected to a respective phase shifter. As an example, the emitter 320 is associated with a phase shifter 330. The Rx signals received at the phase shifters 331-335 may be provided to receiver components including the sensor 118, and the Tx signals from the phase shifters 331-335 may be provided to the respective emitters of the plurality of emitters 320. The architecture for the plurality of phase shifters 330 may include at least one layer of phase shifters having at least one phase shifter connected to an emitter of the plurality of emitters 320. In some examples, the phase shifter architecture may include a plurality of layers of phase shifters, where phase shifters in a first layer may be connected in series with one or more phase shifters in a second layer.

A communication link 22 may be formed between the first communications terminal 102 and the second communications terminal 122 when the transceivers of the first and second communications terminals are aligned. The alignment can be determined using the optical communications beams 20a, 20b to determine when line-of-sight is established between the communications terminals 102, 122. Using the communication link 22, the one or more processors 104 can send communication signals using the optical communications beam 20a to the second communications terminal 122 through free space, and the one or more processors 124 can send communication signals using the optical communications beam 20b to the first communications terminal 102 through free space. The communication link 22 between the first and second communications terminals 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

Figure 4:
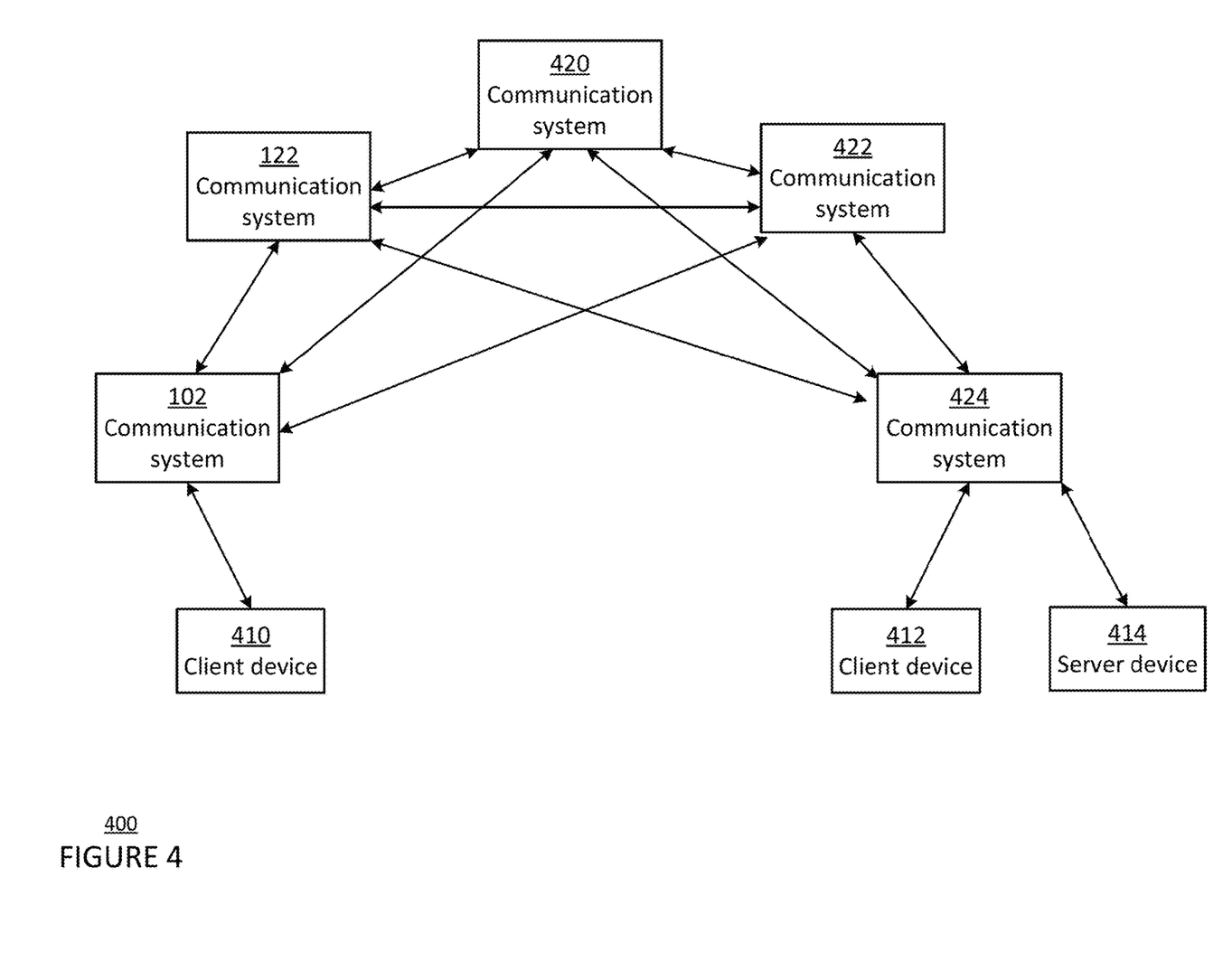
FIG. 4 is a pictorial diagram of a network in accordance with aspects of the disclosure.

As shown in FIG. 4, a plurality of communications terminals, such as the first communications terminal 102 and the second communications terminal 122, may be configured to form a plurality of communication links (illustrated as arrows) between a plurality of communications terminals, thereby forming a network 400. The network 400 may include client devices 410 and 412, server device 414, and communications terminals 102, 122, 420, 422, and 424. Each of the client devices 410, 412, server device 414, and communications terminals 420, 422, and 424 may include one or more processors, a memory, a transceiver chip, and an OPA architecture (e.g., OPA chip or chips) similar to those described above. Using the transmitter and the receiver, each communications terminal in network 400 may form at least one communication link with another communications terminal, as shown by the arrows. The communication links may be for optical frequencies, radio frequencies, other frequencies, or a combination of different frequency bands. In FIG. 4, the communications terminal 102 is shown having communication links with client device 410 and communications terminals 122, 420, and 422. The communications terminal 122 is shown having communication links with communications terminals 102, 420, 422, and 424.

The network 400 as shown in FIG. 4 is illustrative only, and in some implementations the network 400 may include additional or different communications terminals. The network 400 may be a terrestrial network where the plurality of communications terminals is on a plurality of ground communications terminals. In other implementations, the network 400 may include one or more high-altitude platforms (HAPs), which may be balloons, blimps or other dirigibles, airplanes, unmanned aerial vehicles (UAVs), satellites, or any other form of high-altitude platform, or other types of moveable or stationary communications terminals. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network.

Example Methods

Figure 8:
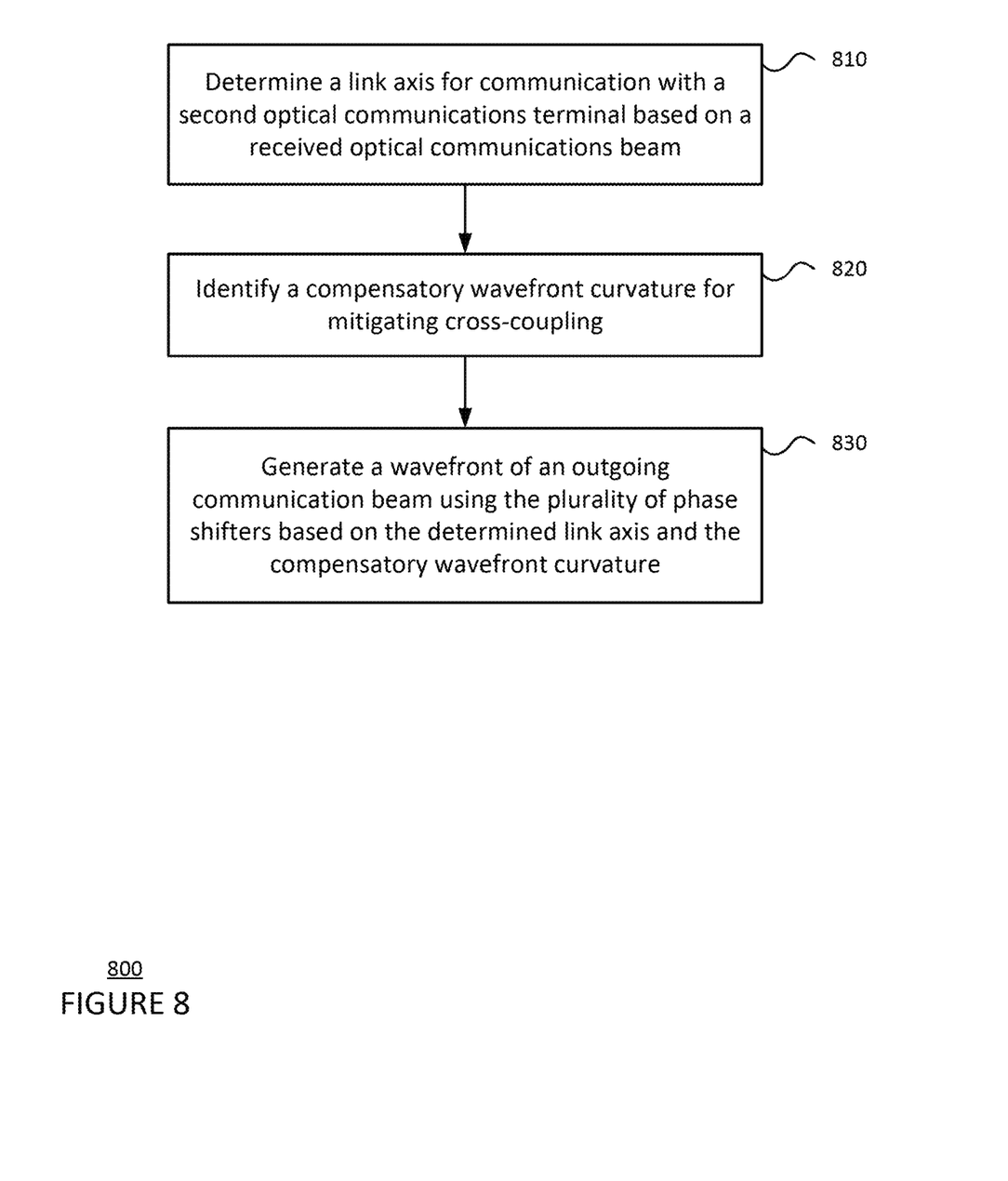
FIG. 8 is a flow diagram in accordance with aspects of the disclosure.

In operation, the one or more processors 104 may perform wavefront sensing and/or correction for optical communication. In FIG. 8, flow diagram 800 is shown in accordance with some of the aspects described above that may be performed by the one or more processors 104 of the first communications terminal 102. Additionally, or alternatively, the one or more processors 124 of the second communications terminal 122 may perform one or more steps of the flow diagram 800. While FIG. 8 shows blocks in a particular order, the order may be varied and that multiple operations may be performed simultaneously. Also, operations may be added or omitted.

At block 810, a link axis for communication with the second communications terminal is determined based on a received optical communications beam. As noted above, the communications terminals may rely on a closed-loop control for the link axis. Any number of different approaches for determining the link axis may be used.

In one instance, an incoming optical communications beam may be received at the micro-lens array of the optical phased array. Each beam portion received at a given micro-lens of the array may be directed to an emitter and thereafter through a phase shifter of a plurality of phase shifters. The beam portions may be coupled to a waveguide, such as an H-tree waveguide, which directs the collected beam portions to receiver components of the communication system to be processed to identify the data carried within the optical communications beam. For example, the optical communications beam 20b may be received at the micro-lens array 310 OPA architecture 114 of communications terminal 102. The optical communications beam 20b may be directed through the phase shifters 320 at OPA architecture 114 towards a single mode waveguide, which directs the optical communications beam to receiver components such as sensor 118.

In addition to this processing to identify the data, the wavefront of the received optical communications beam may be processed to determine x-tilt and y-tilt which define the apparent link axis with the remote communications terminal. The wavefront of the incoming optical communications beam may have an arbitrary profile received at the plurality of phase shifters 320 that can be expressed as a combination of orthogonal modes or patterns of phase shifters. In some instances, these patterns may be defined using a plurality of N×N orthogonal functions such as a plurality of N×N Walsh functions ("Walsh modes"). As an example, for an N×N configuration of a plurality of phase shifters of the OPA architecture, where N is a power of 2, the x-tilt or wavefront phase tilt in the X-direction may be expressed as a linear combination of modes $W_{0,1}$, $W_{0,3}$, $W_{0,7}$, ... $W_{0(N-1)}$. Similarly, the y-tilt or wavefront phase tilt in the Y-direction may be expressed as a linear combination of modes $W_{1,0}$, $W_{3,0}$, $W_{7,0}$, ..., $W_{(N-1),0}$. The coefficients of each mode (magnitude and sign) necessary to represent the incoming wavefront may be determined by application of that specific mode to the OPA (with a small magnitude), and noting the change of power coupled to the waveguide due to the configuration of the OPA and communications terminal. By doing so, all the coefficients necessary to best represent the wavefront as a linear combination of Walsh modes $W_{m,n}$ may be determined.

Maximizing the coupling to the top of an H-tree waveguide of the OPA architecture may involve applying the linear combination of Walsh modes to the OPA architecture with the above determined coefficients, but of opposite sign, so the phase aberration of the incoming wavefront is canceled out while simultaneously a transmitted communication beam is sent along the apparent link axis. In this regard, a communications beam launched from the OPA architecture in this condition forms a wavefront identical to the incoming wavefront but traveling in the opposite direction (a "phase conjugated" wave).

In the case of a communication beam transmitted from one communications terminal to the other, the normal to the tilt component of the incoming wavefront may provide the direction to the apparent location of the transmitting terminal. This may be different from the actual location of the transmitting terminal for shorter link distance and any degree of mis-pointing between the terminals. The receiving communications terminal will launch its return optical communications beam toward the apparent location of the transmitting terminal. If there is no time-dependent perturbation affecting the angle-of-arrival of the beams, the communications terminals can iteratively adjust the plurality of phase shifters by sequential dither of pointing (via the aforementioned Walsh modes) until they point along a common axis (i.e. the link axis).

In addition to this, a "cross-coupling" effect may result from the natural evolution of a wavefront of an optical communications beam as it propagates from the transmitting communications terminal to the receiving communications terminal due to the improper pointing of the communications terminals along a link axis. For instance, a pair of optical communications terminals may start in equilibrium pointing at each other. A slight deviation in pointing of a first of the communications terminals (from vibration, outside influence, etc.) may then result in a second of the communications terminals perceiving an optical communications beam from the first communications terminal as indicating a change in position of the first optical communications terminal. The second communications terminal may then adjust its own pointing toward the apparent location of the first communications terminal resulting in a mis-pointing of an optical communications beam from the second optical communications terminal and so on thereby resulting in the cross-coupling across the link.

Depending on the wavelength, distance between the communications terminals, and size of the aperture (of the transmitting communications terminal), when a transmitting communications terminal transmits a signal including a flat or planar wavefront, various factors may cause an improper sensing of tilt at the receive terminal. For example, in the gaussian approximation as the initially flat-wavefront beam propagates from the launch aperture, the radius of curvature slowly gets smaller (still much larger than the distance back to the launch aperture) until it reaches a minimum at a distance of one "Rayleigh range" from the launch aperture. After sufficient propagation, eventually the wavefront radius of curvature may be about equal to the distance back to the launch aperture.

Mismatch between the wavefront radius of curvature and the distance back to the launch aperture can give rise to cross-coupling or which places the apparent position of the transmitting communications terminal at a distance behind its true location. As a result, the receiving communications terminal may receive a section of a spherical wavefront with a center-of-curvature located at a point behind the transmitting communications terminal. The receiving communications terminal will then transmit back to this point, and not to the actual location of the transmitting communications terminal. This improper pointing is most pronounced at link distances on order of twice the Rayleigh distance or shorter, where the Rayleigh distance is a distance proportional to the square of the launch beam radius divided by the wavelength of the wavefront. The launch beam radius may be equal or somewhat smaller than the aperture radius depending on the intensity profile of the launch beam. For example, a Gaussian beam with a $1/e^2$ radius equal to the aperture radius a may be launched from the terminal. In this case the Rayleigh range will be approximately:

$$\frac{\pi * a^2}{\lambda}.$$

Figure 5A:
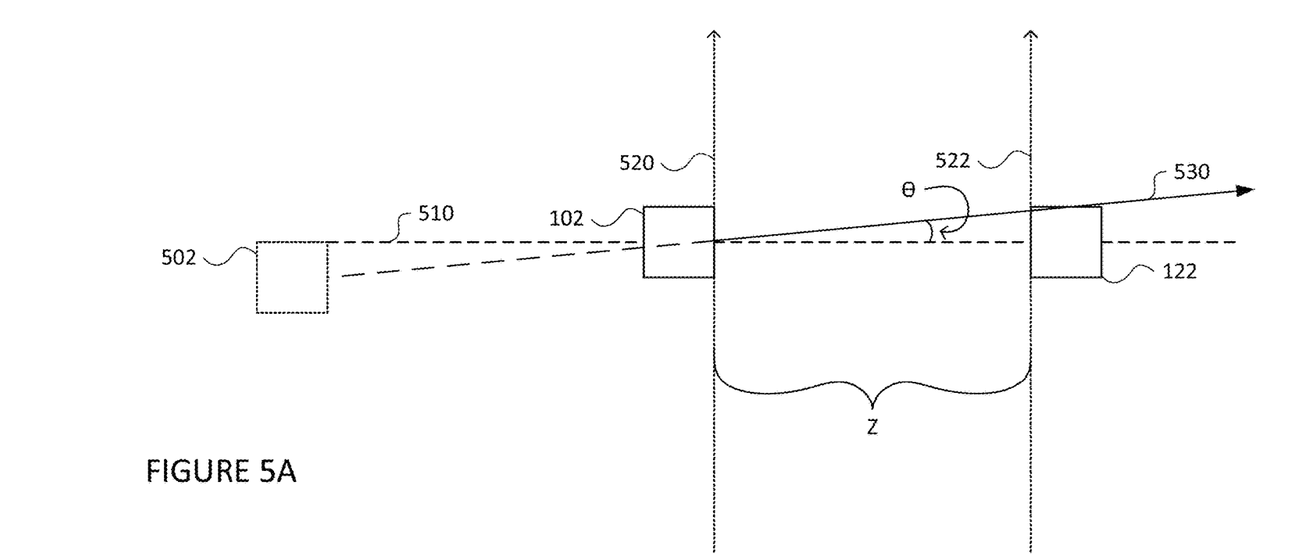
FIGS. 5A and 5B are an example representation of a cross-coupling effect in accordance with aspects of the disclosure.
Figure 5B:
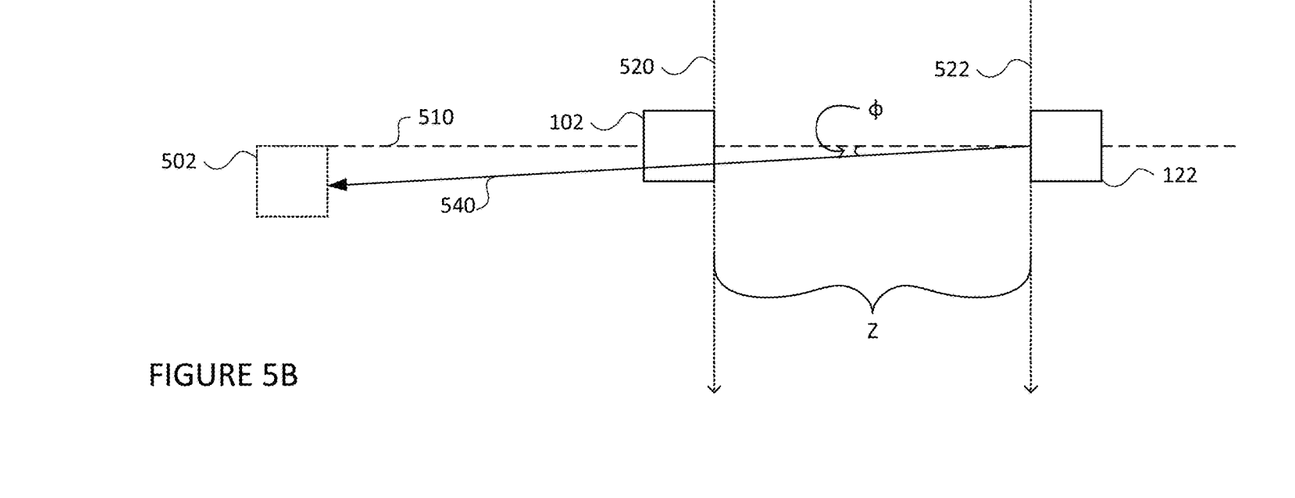

FIGS. 5A and 5B represent this cross-coupling concept visually (though not to scale). In this example, the apertures of the communications terminals 102 and 122 are separated by a distance Z along an axis 510. The apertures of these communications terminals are positioned in the planes 520, 522, respectively. As shown in FIG. 5A, the communications terminal 102 sends an optical communications beam 530 to the communications terminal 122. Due to the aforementioned cross-coupling effect, the optical communications beam 530 is not directed exactly to the communications terminal 122, but offset an angle θ relative to the axis 510 between the apertures of the communications terminals. Because of this, the communications terminal 122 "sees" the communications terminal 102 along the axis of the tilt at location 502 behind the actual location of the communications terminal 102. In other words, the determined link axis and adjustments made to the phase shifters to adjust for the link axis will be incorrect. Turning to FIG. 5B, the communications terminal 122 sends an optical communications beam 540 back to the location 502 rather than to the location of the communications terminal 102. The optical communications beam 540 is sent at an angle Φ relative to the axis 510 between the apertures of the communications terminals. The value of angle Φ is half of the value of angle θ.

To address this improper pointing, the radius-of-curvature of a wavefront sent by the transmitting communications terminal may be adjusted by imposing a specific compensatory wavefront curvature at the transmitting communications terminal. If done correctly, the receiving communications terminal may detect a spherical wavefront with center of curvature located exactly at the transmitting communications terminal (instead of behind it as depicted in FIGS. 5A and 5B). Thus, the receiving communications terminal may be able to point back at the transmitting communications terminal correctly, eliminating the improper pointing, and therefore eliminating the cross-coupling effect.

For example, returning to FIG. 8, at block 820, a compensatory wavefront curvature for mitigating cross-coupling is identified. For instance, the compensatory wavefront curvature may be identified or determined (e.g., in advance) based on the distance between the two communications terminals, the frequency of the wavefront to be generated, and the respective aperture sizes of the transmitting and receiving communications terminals. For example, the output from each of the communications terminals may be approximated as gaussian beams (although the OPA architectures described herein may transmit and receive uniform intensity beams). The wavefront curvature of the optical communications beam evolves as a function of the Rayleigh length (determined by the waist radius and wavelength of the beam) and the distance from the waist. The Rayleigh length zR may be determined by the equation:

$$\frac{\pi * w^2}{\lambda}$$

In this example, w is the waist radius of the optical communications beam, and the $\lambda$ is the wavelength of the optical communications beam. The compensatory wavefront curvature may then be determined using the equation:

$$Z_r * \left[1 + \left(\frac{zR}{Z_r}\right)^2\right]$$

In this example, $Z_r$ is the desired distance between the waist of the optical communications beam and one of the communications terminals (e.g., half way between the communications terminals) or ½ of Z (the distance between the apertures of the two communications terminals). In addition, zR is the Rayleigh range of the new beam-waist formed by the (transmitting) optical communications terminal at the distance $Z_r$. Because the transmitting optical communications terminal is initially assumed to launch a Gaussian beam of $1/e^2$ with radius w, with an infinite radius of curvature (i.e. a flat wavefront) and the receiving optical communications terminal is assumed to be at the Rayleigh distance $$Z_r = \frac{\pi * w^2}{\lambda}$$

of the original launch beam away, if the new communications beam has beam radius "w" at the launch aperture, then the proper curvature that it needs to have in order to form a new beam waist of radius w/sqrt(2) midway (e.g., midpoint) between the two communications terminals, will be $$R = \frac{\pi * w^2}{\lambda}.$$

This approach may allow for the matching of a received communications beam's wavefront curvature to the separation between the terminals. Of course, even if the minimum beam width along the link is not exactly midway between the two communications terminals, so long as the communications beam is focused slightly (e.g. at all) this approach may also work to varying degrees for cross-coupling mitigation.

At block 830, a wavefront of an outgoing communications beam is generated using the plurality of phase shifters based on the determined link axis and the compensatory wavefront curvature. Such a compensatory wavefront at the transmitting communications terminal may be generated by the OPA architecture within the transmitting communications terminal. Instead of simply launching a wavefront propagating along the determined link axis, sets of phase shifters of the OPA may launch a section of a spherical wavefront of curvature determined by the aforementioned parameters. Thus, the phase shifters of the OPA may add additional tip and tilt to the wavefront in order to adjust the pointing of a wavefront in order to compensate for the cross-coupling effect. This may be in addition to other adjustments to a flat wavefront made by the phase shifters of the OPA of the transmission communications terminal to direct the wavefront along the link axis (e.g., in order to account for vibrations and maintain a steady beam pointed at the receiving communications terminal).

At least one phase shifter of the communication system may be adjusted by the one or more processors based on the determined wavefront error and the compensatory wavefront. Adjustment of the at least one phase shifter may be performed in order to achieve improved coupling of the incoming optical communications beam at the OPA architecture, which may also improve coupling of an outgoing optical communications beam at a remote communication system. The improved coupling at the OPA architecture may cause the in-phase portion of an output beam at a given combiner to increase while causing the out-of-phase portion of the output beam to decrease at the given combiner. Flow diagram 800 of FIG. 8 may be part of a feedback loop performed by the one or more processors that is repeated to minimize the power measured in the out-of-phase portion of the output beam. The feedback loop may include making phase shifter adjustments at each cycle. The closer the out-of-phase portion of the output beam is to zero intensity, the better the coupling is to the in-phase portion of the output beam, and thus to the rest of the receive path.

In other implementations, the one or more processors may additionally or alternatively adjust a wavefront or pointing direction based on the determined wavefront error. The wavefront and/or pointing direction may be adjusted mechanically and/or electronically. The mechanical steering may include controlling an angle of a secondary steering element, such as an actuated mirror. The electronic steering may include controlling the plurality of phase shifters, such as by setting phase shift settings for each phase shifter. In some implementations, steering the secondary steering element may be used for larger-scale, low frequency adjustments, and steering using the plurality of phase shifters may be for smaller-scale, high frequency adjustments. For example, the one or more processors 104 may adjust a wavefront and/or pointing direction of the communications terminal 102 based on the determined wavefront error. The mechanical steering may include controlling the steering mirror (not shown). The electronic steering may include controlling the plurality of phase shifters.

Once the at least one phase shifter is adjusted, a wavefront of an outgoing optical communications beam may be transmitted using the photonic integrated chip and the at least one adjusted phase shifter. For example, the one or more processors 104 may transmit an optical communications beam 20a the features of the OPA architecture 114. In some implementations, a first set of processors may perform the detecting of the magnitude or intensity measurement, the determining of the link axis, and the adjusting of the at least one phase shifter, while a second set of processors may perform the transmitting of the outgoing optical communications beam. The first set of processors may perform the steps in a feedback loop that may be used to track changes in the incoming optical communications beam. Changes may include position changes, such as drift, fading or scintillation, or other types of changes.

Figure 6:
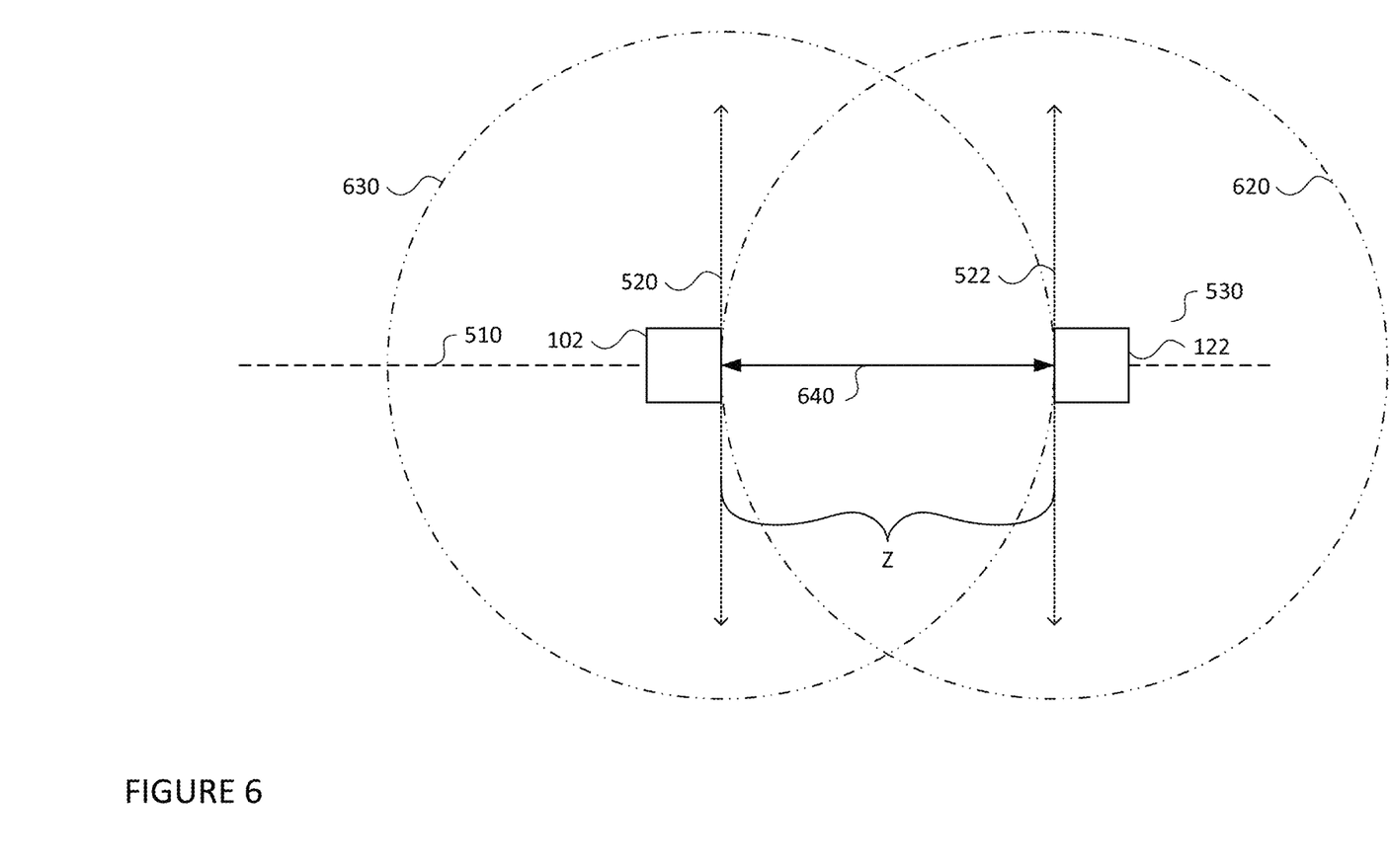
FIG. 6 is an example representation of elimination of a cross-coupling effect in accordance with aspects of the disclosure.

Turning to FIG. 6 (also not to scale), by adjusting an outgoing communications beam using a compensatory wavefront combined with the adjustment for the link axis detection as described herein, the receiving terminal will detect the transmitting terminal at its actual location. As such, the receiving terminal, communications terminal 122, may point its outgoing optical communications beam correctly back towards the transmitting communications terminal, here communications terminal 102, mitigating by reducing and possibly eliminating the cross-coupling error between the two terminals.

FIG. 6 represents the example of FIG. 5A with the desired radius of curvatures of the wavefronts 620, 630. In this example, by adjusting the optical communications beams 640 (shown in two directions) using the compensatory wavefront combined with the adjustment for the link axis detection as described herein, the communications terminal 102 will direct the optical communications beam 640 directly to the communications terminal 122, and the communications terminal 122 will direct the optical communications beam 640 directly back to the communications terminal 102.

Figure 7:
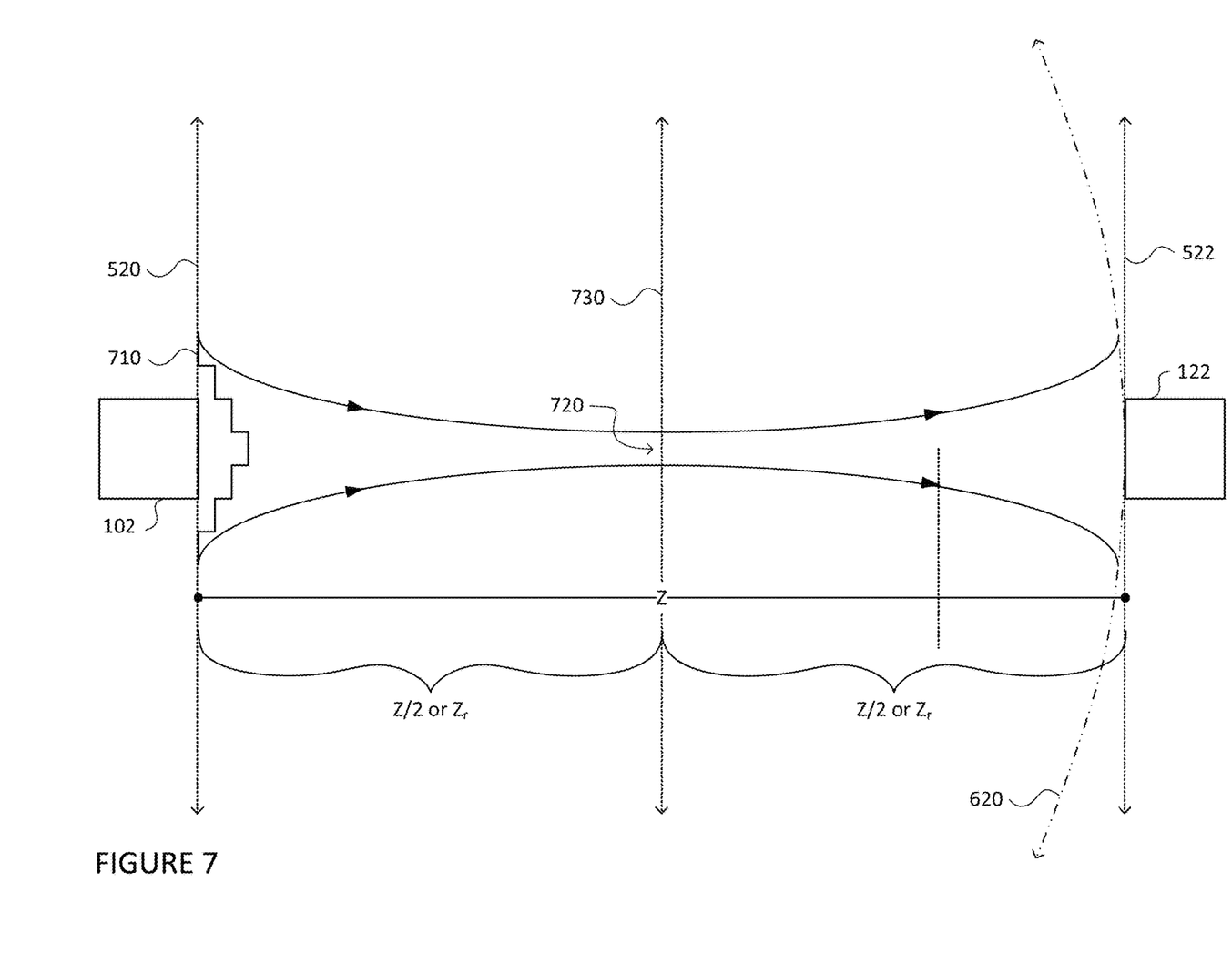
FIG. 7 is an example representation of elimination of a cross-coupling effect in accordance with aspects of the disclosure.

Turning to FIG. 7 (also not to scale), the resulting wavefront 710 of the outgoing optical communications beam may have a beam waist 720 midway between the transmitting communications terminal and the receiving communications terminal (e.g., midway between communications terminal 102 and communications terminal 122 within the plane 730). This beam waist is the location the location along the propagation direction where the converging beam radius reaches a minimum and begins diverging again. In addition, the radius of curvature of the wavefront when received at the receiving communications terminal may be equal to the distance Z between the transmitting communications terminal and the receiving communications terminal.

This compensatory wavefront curvature may be calculated once if the communications terminals are fixed (e.g., mounted on a building or other fixed structure) or may be determined in real time if and when changes in the distance between the communications terminals occur. The distance may be measured and/or confirmed based on the timing of the transmission of a signal by the transmitting communications terminal (which may be embedded in the signal itself) and the timing of the receipt of that signal at the receiving communications terminal. This timing information may therefore be received by the transmitting communications terminal from the receiving communications terminal.

The features described herein may provide for adjustments to curvature in a transmitted wavefront in order to mitigate cross-coupling between communications terminals in optical communications systems. This may result in more accurate pointing and therefore better overall performance of the communication system. Moreover, for distances less than twice the Rayleigh distance, then the converging wavefront applied to a communications beam may also improve received power at the receiving communications terminal, because the final beam size at the aperture of the receiving optical communications terminal will be smaller than if a flat wavefront beam had been launched.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a first communications terminal comprising:
      an optical phased array (OPA) including a plurality of phase shifters configured to receive an optical communications beam from a second communications terminal; and
      one or more processors configured to:
         determine a link axis for communication with the second communications terminal based on the received optical communications beam;
         identify a compensatory wavefront curvature for mitigating cross-coupling; and
         generate a wavefront of an outgoing optical communications beam using the plurality of phase shifters based on the determined link axis and the compensatory wavefront curvature.

2. The system of claim 1, further comprising the second communications terminal.

3. The system of claim 1, wherein the one or more processors are further configured to identify the compensatory wavefront curvature by determining the compensatory wavefront curvature based on a distance between the first communications terminal and the second communications terminal, a wavelength of the wavefront, and an aperture sizes of the first communications terminal or the second communications terminal.

4. The system of claim 3, wherein the one or more processors are further configured to:
   determine an updated distance between the first communications terminal and the second communications terminal; and
   adjust the compensatory wavefront curvature based on the updated distance.

5. The system of claim 4, wherein the updated distance is determined based on timing information received by the first communications terminal from the second communications terminal.

6. The system of claim 1, wherein the generated wavefront has a beam waist midway between the first communications terminal and the second communications terminal.

7. The system of claim 1, wherein a radius of curvature of the generated wavefront when received at the second communications terminal is equal to a distance between the first communications terminal and the second communications terminal.

8. A method comprising for generating an outgoing communications beam at a first communications terminal, the method comprising:
   determining, by one or more processors, a link axis for communication with a second communications terminal based on a received optical communications beam;
   identifying, by the one or more processors, a compensatory wavefront curvature for mitigating cross-coupling; and
   generating, by the one or more processors, a wavefront of an outgoing optical communications beam using a plurality of phase shifters of an optical phased array (OPA) architecture based on the determined link axis and the compensatory wavefront curvature.

9. The method of claim 8, further comprising transmitting the outgoing optical communications beam to the second communications terminal.

10. The method of claim 8, wherein identifying the compensatory wavefront curvature includes determining the compensatory wavefront curvature based on a distance between the first communications terminal and the second communications terminal, a wavelength of the wavefront, and respective aperture sizes of the first communications terminal and the second communications terminal.

11. The method of claim 10, further comprising:
determining an updated distance between the first communications terminal and the second communications terminal; and
adjusting the compensatory wavefront curvature based on the updated distance.

12. The method of claim 11, wherein the updated distance is determined based on timing information received by the first communications terminal from the second communications terminal.

13. The method of claim 8, wherein the generated wavefront has a beam waist midway between the first communications terminal and the second communications terminal.

14. The method of claim 8, wherein a radius of curvature of the generated wavefront when received at the second communications terminal is equal to a distance between the first communications terminal and the second communications terminal.

15. A non-transitory machine-readable medium on which instructions are stored, the instructions, when executed by one or more processors, cause the one or more processors to perform a method of generating an outgoing communications beam at a first communications terminal, the method comprising:
determining a link axis for communication with a second communications terminal based on a received optical communications beam;
identifying a compensatory wavefront curvature for mitigating cross-coupling; and
generating a wavefront of an outgoing optical communications beam using a plurality of phase shifters of an optical phased array (OPA) architecture based on the determined link axis and the compensatory wavefront curvature.

16. The medium of claim 15, wherein the method further comprises transmitting the outgoing optical communications beam to the second communications terminal.

17. The medium of claim 15, wherein identifying the compensatory wavefront curvature includes determining the compensatory wavefront curvature based on a distance between the first communications terminal and the second communications terminal, a wavelength of the wavefront, and an aperture sizes of the first communications terminal or the second communications terminal.

18. The medium of claim 17, wherein the method further comprises:
determining an updated distance between the first communications terminal and the second communications terminal; and
adjusting the compensatory wavefront curvature based on the updated distance.

19. The medium of claim 15, wherein the generated wavefront has a beam waist midway between the first communications terminal and the second communications terminal.

20. The medium of claim 15, wherein a radius of curvature of the generated wavefront when received at the second communications terminal is equal to a distance between the first communications terminal and the second communications terminal.

* * * * *